United States Patent [19]

Augusteijn et al.

[11] Patent Number: 4,961,137

[45] Date of Patent: Oct. 2, 1990

[54] METHOD FOR OPERATING A MULTIPROCESSOR SYSTEM FOR THEREIN ESTABLISHING A GLOBAL BINARY ASSERTION AND A MULTIPROCESSOR APPARATUS COMPRISING SYNCHRONIZATION MEANS FOR SUCH ESTABLISHING, IN PARTICULAR FOR EFFECTING A GARBAGE COLLECTION OPERATION

[75] Inventors: Alexander Augusteijn; Fransiscus P. M. Hopmans, both of Eindhoven, Netherlands

[73] Assignee: U.S. Philips Corporation, N.Y.

[21] Appl. No.: 40,007

[22] Filed: Apr. 17, 1987

[51] Int. Cl.$^5$ .............................................. G06F 1/00
[52] U.S. Cl. .................................. 364/200; 364/280; 364/281.1; 364/245; 364/246
[58] Field of Search ... 364/200 MS File, 900 MS File

[56] References Cited

U.S. PATENT DOCUMENTS

| | | | |
|---|---|---|---|
| 4,084,228 | 4/1978 | Dufond et al. | 364/200 |
| 4,177,510 | 12/1979 | Apell et al. | 364/200 |
| 4,395,757 | 7/1983 | Bienvenu et al. | 364/200 |
| 4,466,064 | 8/1984 | Martin . | |
| 4,695,949 | 9/1987 | Thuttle et al. . | |
| 4,733,347 | 3/1988 | Fukuoka | 364/200 |
| 4,775,932 | 10/1988 | Oxley et al. . | |
| 4,807,120 | 2/1989 | Courts | 364/200 |

OTHER PUBLICATIONS

Steele, Jr., Guy L., "Multiprocessing Compactifying Garbage Collection", Comm. of the ACM, vol. 18, No. 9, Sep. 1975, pp. 495–508.
Geib, Jean-Marc et al. "A Distributed aned Protected System, which Maintains Modularity up to Execution", Concurrent Lang. in Dist. Systems, IFIP 1985.
Plessmann, K. W. et al., "Concurrent, Object-Oriented Program Design in Real-Time Systems", Microprocessing and Microprograming, 24 (1988) pp. 257–266.
Gupta, A. et al., "Reliable Garbage Collection in Distributed Object Oriented Systems", IEEE, 1988, pp. 324–328.
Chandy, K. et al., "Distributed Snapshots: Determining Global States of Distributed Systems", ACM Trans. on Comp. Sys., vol. 3, No. 1, Feb. '85, pp. 63–75.
Hudak, Paul, et al., "Garbage Collection and Task Deletion in Distributed Applicative Processing Systems", 1982 ACM Symposium on Lisp and Functional Programming, Aug. 15–18, 1982, pp. 168–178.
E. W. Dikstra et al., "On the Fly Garbage Collection: an Exercise in Cooperation", Com. ACM 21, No. 11, (11/78) pp. 966–975 (referred to in specification).

*Primary Examiner*—Gareth D. Shaw
*Assistant Examiner*—Rebecca L. Rudolph
*Attorney, Agent, or Firm*—Anne E. Barschall

[57] ABSTRACT

A method and apparatus is described for establishing a global binary assertion in a multiprocessor environment. The local objects have a three-value status variable: -active, disquiet-, -passive, quiet-, and -passive, disquiet- being the three values. First all local objects are made active. During execution, locally the assertion may hold, and thereupon a transition from active to -passive, quiet- is signalled to a global synchronizer process. Thereafter, cross-requests from a non-local object may reactivate a quiet object to the state -passive, disquiet-. The synchronizer process counts the transitions from active to -passive, quiet- and thus can detect when all objects are quiet. The local operations may represent a garbage collection system, wherein originally root items are colored grey and all other items white. In a marking phase, all grey items are successively accessed. After verifying any other item referred to by such grey item, and if white, discoloring it to grey, the original item is discolored to black. If locally no grey items are left, the local collector process goes to the state -passive, quiet-. Cross-processor references may awake it to either verifying a locally correct black color, or discoloring a white item to grey and restarting the color verification when no grey items are left globally, the synchronizer has reached the ultimate count, and vice versa. Thereafter, white objects are treated as garbage.

14 Claims, 6 Drawing Sheets

CLASS Synchronizer

VAR processes : Array(Process),
    n : Integer

ROUTINE new (p : Integer) Synchronizer :
    RETURN NEW ! init (p)
END new

METHOD init (p : Integer) Synchronizer :
    n ← p
    RETURN SELF
END init

METHOD create () Synchronizer :
LOCAL i : Integer IN
    processes ← Array(Process).new (0, n−1);
    i ← 0;
    DO i < n THEN
        processes ! put (i, Process.new (SELF, processes));
        i ← i + 1
    OD;
    i ← 0;
    DO i < n THEN
        (processes @ i) ! start ();
        i ← i + 1
    OD
    RETURN SELF
END create METHOD await_retiring () Synchronizer :
LOCAL i : Integer IN
    i ← 0;
    DO i < n THEN
        ANSWER (retire);
        i ← i + 1
    OD
    RETURN SELF
END await_retiring METHOD retire () Synchronizer :
    RETURN SELF
END retire METHOD signal_all () Synchronizer :
LOCAL i : Integer IN
    i ← 0;
    DO i < n THEN
        (processes @ i) ! signal ();
        i ← i + 1
    OD
    RETURN SELF
END signal_all BODY
    ANSWER (init);
    create ();
    await_retiring ();
    signal_all ()

END Synchronizer

Table I

CLASS Worker

VAR processes : Array(Process),
    myprocess : Process

ROUTINE new (myp : Process, p : Array (Process)) Worker :
    RETURN NEW ! init (myp, p)
END new METHOD init (myp : Process, p : Array (Process)) Worker :
    myprocess ← myp;
    processes ← p
    RETURN SELF
END init METHOD delegate_sub_job (p : Process) Worker :
    myprocess ! add_child ();
    IF ~(p ! sub_job (myprocess))
    THEN myprocess ! remove_child ()
    FI
    RETURN SELF
END delegate_sub_job METHOD do_the_job () Worker :

RETURN SELF
END do_the_job

BODY
    ANSWER (init);
    DO TRUE THEN
        myprocess ! next_job ();
        do_the_job ();
        myprocess ! job_ready ()
    OD END Worker

Table II

CLASS Process

VAR active, quiet, dead : Boolean,
    synchronizer : Synchronizer,
    father : Process,
    children, jobs : Integer ROUTINE new (s : Synchronizer, p : Array(Process)) Process :
    RETURN NEW ! init (s, p)
END new METHOD init (s : Synchronizer, p : Array(Process)) Process :
    synchronizer ← s;
    Worker.new (SELF, p);
    active ← TRUE;
    quiet ← FALSE;
    dead ← FALSE;
    children ← 0;
    jobs ← 1
    RETURN SELF
END init METHOD start () Process :
    RETURN SELF
END start METHOD add_child () Process :
    children ← children + 1
    RETURN SELF
END add_child METHOD remove_child () Process :
    children ← children − 1
    RETURN SELF
END remove_child

Table III a

```
METHOD sub_job (p : Process) Boolean :
    jobs ← jobs + 1
    RETURN quiet
POST
    IF quiet
    THEN father ← p
    FI;
    quiet ← FALSE
END sub_job METHOD job_ready () Process :
    jobs ← jobs - 1
    RETURN SELF
END job_ready METHOD next_job () Process :
    RETURN SELF
END next_job METHOD work () Process :
    quiet ← (jobs + children) = 0;
    DO ¯quiet THEN
        SEL jobs > 0 ANSWER (next_job)
        OR ANSWER (job_ready)
        OR ANSWER (add_child)
        OR ANSWER (remove_child)
        OR ANSWER (sub_job)
        LES;
        quiet ← (jobs + children) = 0
    OD
    RETURN SELF
END work METHOD retire () Process :
    synchronizer ! retire ();
    active ← FALSE
    RETURN SELF
END retire METHOD wait_for_signal () Process :
    DO ¯dead THEN
        SEL ANSWER (sub_job)
            THEN work ();
                father ! remove_child ()
        OR ANSWER (signal)
        LES
    OD
    RETURN SELF
END wait_for_signal METHOD signal () Process :
    dead ← TRUE
    RETURN SELF
END signal BODY
    ANSWER (init);
    ANSWER (start);
    work ();
    retire ();
    wait_for_signal ()

END Process
```

Table III b

METHOD FOR OPERATING A MULTIPROCESSOR SYSTEM FOR THEREIN ESTABLISHING A GLOBAL BINARY ASSERTION AND A MULTIPROCESSOR APPARATUS COMPRISING SYNCHRONIZATION MEANS FOR SUCH ESTABLISHING, IN PARTICULAR FOR EFFECTING A GARBAGE COLLECTION OPERATION

BACKGROUND TO THE INVENTION

The invention relates to a method for operating a multiprocessor data processing system for therein establishing a global binary assertion. Multiprocessor systems have become widespread. Generally, they exist in two categories. The first do what is called SIMD(=single instruction multiple data), wherein all processors execute roughly the same operations on respective different data. Often these systems are so-called array processors. The second category is much less structured, and here various processors operate mostly independently, while interacting from time to time. Such interactions occur then on the level of the single or plural processes assigned to each respective processor, while the interactions may change the value of one or more local status variables. It has been found necessary to establish global assertions about such local status variables; such a global assertion should then take into account forseeable future changes of the local variables to be made by processes other than the one the variable(s) were privy to. Such changes could be the result of a chain reaction. An example would be the assertion whetfier or not the respective processes in the various processors are ready with a particular program: even if they were not busy at a particular instant, a request from another process could bring such processes back to activity (while the reactivated process could produce further reactivating requests to still other processes). Such an assertion may be used for synchronization.

A still more complicated case occurs when the global assertion is to be made on sets of local variables at one particular instant with respect to their having attained a stable collective state, each set being privy to its associated processor. A prime example of the latter problem is "garbage collection" is distributed memory (each processor has its own, non-shared, local memory), which example hereinafter is considered in detail.

SUMMARY OF THE INVENTION

It is an object of the invention to provide a fail-safe system for establishing a globally stable assertion in a multiprocessor system, wherein "stable" means that the situation attained remains unchanged, until some release operation is effected. Before this stable situation is attained the value of the underlying variable(s) may be changed by any other object throughout the multiprocessor system. Note that the invention does not relae to such independent objects that represent a signalization that is valid throughout the system, such as the clocked period or the power up/down situation. The object of the invention is realized in that it provides a method for operating a multiprocessor data processing system, each processor comprising at least one object, and each object having a three-valued state variable with respective value ranges:
active, disquiet
passive, quiet
passive, disquiet,
and wherein any object when in any disquiet state is allowed to render any other object disquiet, but not so when in the quiet state, wherein any object (father) having rendered another object (child) in a disquiet state is kept in its actual state at least as long as said other object remains disquiet, and wherein any object not so kept ina disquiet state is allowed to selfreliantly go to said passive, quiet state while signalling same to another object that it self had kept unquiet, said method comprising the following steps;
  a. assigning to each object a local process that handles all interactions with other such objects;
  b. assigning a global synchronizer process for determining when all processes have at least once gone to the passive state;
  c. making all state variables active, disquiet, and executing said objects, and sending a retirement signalization from each respective object when it goes from said active, disquiet state to said passive, quiet state, to said synchronizer process;
  d. in said global synchronizer process determining when the number of said retirement signalizations becomes equal to the number of said processes, all processes then being passive, quiet.

The stable situation prevails when each state variable has passed once from active to passive, quiet; the establishing of each such passage being of elementary complication only.

The invention also relates to a method for operating a multiprocessor data processing system, especially for garbage collection with respect to a plurality of stored memory items, wherein each said object is a local collector process privileged for accessing a respective predetermined number of memory items associated to one respective processor while forbidding such accessing to any other collector process, each said collector process initially assigns to each memory item that is a root item a condition generative indication (grey) and to each other object a conditional indication (white) and wherein to each local collector process is assigned a marker process privy thereto, for thereupon, while successively accessing any local grey item and determining whether it is referring to any other local or non-local memory item, and thereafter coloring the former, local grey item, to an unconditional (black) while upon a positive result of said determining, coloring any said other local memory to grey if up to then it were white, but requesting, in case of such non-local memory item, for any such non-local memory item an associated collector process (50) to effect the coloring of such, then local, memory item, but in case of a negative result of said determining leaving all other item's color than the first accessed memory item's unchanged, until no grey objects are left, wherein each local collector process has an associated state variable with said value range of (-active, disquiet-, -passive, quiet-, and -passive, disquiet-) and each local collector process signals a transition to -passive, quiet- when locally no grey memory item be left, and thereafter a transition from -passive, quiet- to -passive, disquiet- upon reception of any request for undertaking a discoloring from white to grey of a local memory item, whereafter the associated marker process is reactivated, and wherein said synchronizer process upon receiving all transition signals from -active, disquiet- to -passive, quiet-signals all collector processes to treat any white memory items as garbage. Garbage collection is a well-known and difficult to solve problem especially in a multiprocessor system in which it is not allowed to stop all processing. For this situation the above gives an attractive and easy to implement solution. In particular, the method adapts directly to changes in the number of processors.

The invention also relates to a multiprocessor apparatus comprising synchronization means for the above establishing, in particular for effecting garbage collection operation. Further advantageous aspects as recited in the dependent claims.

BRIEF DESCRIPTION OF THE FIGURES

The invention hereinafter is explained in detail, such explanation being non-restrictive regarding the appended claims, with respect to the following figures. Such explanation, for reasons of clarity, starts with describing a multiprocessor apparatus; then the nature of the synchronization in such multiprocessor apparatus is explained. Thereafter, the garbage collection problem is explained and possible solutions, first for a single-process environment and thereafter for a single processor, multiprocess environment are given. Finally, a preferred embodiment according to the present invention, featuring a garbage collection system in a multiprocessor distributed apparatus with a synchronization means according to the earlier described synchronization organization is given.

Tables Ia, b give the elements of the synchronizer process in POOL-T;

Table II gives the elements of the -worker- process in POOL-T;

Tables IIIa, b give the elements of the local process in POOL-T.

GENERAL DESCRIPTION OF A MULTIPROCESSOR APPARATUS

Figure 1:
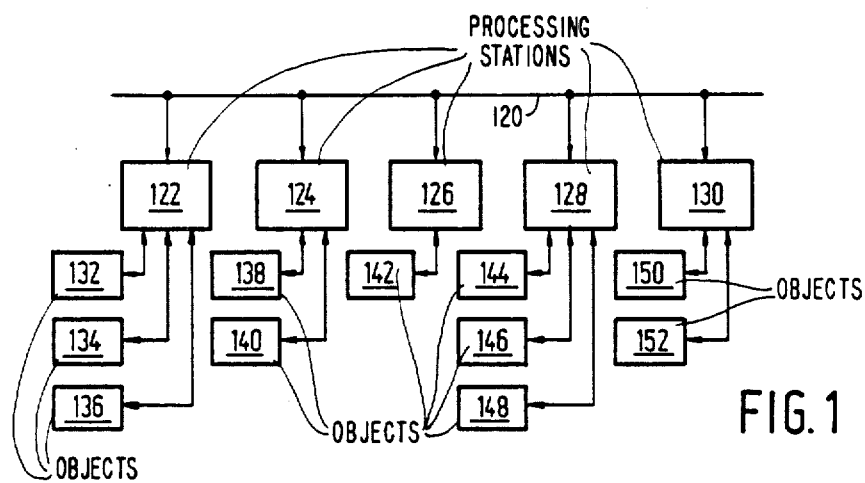
FIG. 1 is a multiprocessor system in which the invention may be used.

FIG. 1 is an elementary block diagram of a multiprocessor apparatus in which the invention may be used. There is a global interconnection network 120, that may be structured physically or organizationally as a bus, ring, broadcast, star, or otherwise. There are five stations 122 ... 130 that may represent an arbitrary higher or lower number of stations, as long as the number is at least equal to 2. The physical disposition or set-up of the stations is irrelevant, but at least a limited processing power must be present in each of them. Each processor station has one or more objects 132 through 152 (memory segments, status variables or other resources). Each object may be characterized by one or more local binary statements. It often becomes necessary to assert a global statement as a binary aggregate of local binary statements on the various processes running in the respective processors. Each process would be assigned to a particular processor. The latter statement is an implicit definition of a processor. Each processor may contain one or more processes. The above global assertion would be required even if the running of a particular process (having its privy local binary statement) could lead to a future change of the local binary statement privy to another process (in the same processor or in another processor). Several examples and also a system for solving this problem are presented hereinafter. For bevity, no further details are given on the art of multiprocessor, which is well-known. The generation and ending of processes, the storage of various quantities, the organization of memory segments, the synchronization primitives on the global interconnection network may all be executed according to one of several known strategems.

SYNCHRONIZATION FOR ESTABLISHING A GLOBAL ASSERTION

Now, the means for a preferred embodiment for establishing a global assertion are described. To this effect a new process called "synchronizer" is created. The task of this synchronizer process is to recognize a globally existing stable state. The synchronizer is activated each time when the assertion has to be made and is put to rest when the assertion has been made. In this regard reference is had to FIG. 2: This is an interrelation diagram among standard processes (i, j) and the synchronizer process. Block 22 represents each respective member of the set of processes that may interact with the synchronizer process 20. These other processes may be user processes as well as system processes. For each such other process a three-valued state variable is defined, with the following values:

active, disquiet
passive, quiet
passive, disquiet.

The synchronizer process must detect the situation wherein all state variables have attained the value "quiet". Now, a quiet process can only become disquiet by receiving a message from another process, which latter process, by virtue of it sending a message, must itself be disquiet. This means that once all processes are quiet, except for the synchronizer process, this state prevails and therefore, is stable. Initially, all processes are active. At a certain instant, a process may go from an active state to a passive, quiet state. Thereafter, it may not revert to the active state. However, interchanges between "quiet" and "disquiet" are possible. Upon the (only) transition from the active state to the passive, quiet state, a process sends the -retire- message to the synchronizer process as shown on arrow 26. This means that all processes are quiet when the number of "retire" messages has become equal to the number of non-synchronizer processes.

DESCRIPTION OF THE SYNCHRONIZER

Figure 2:
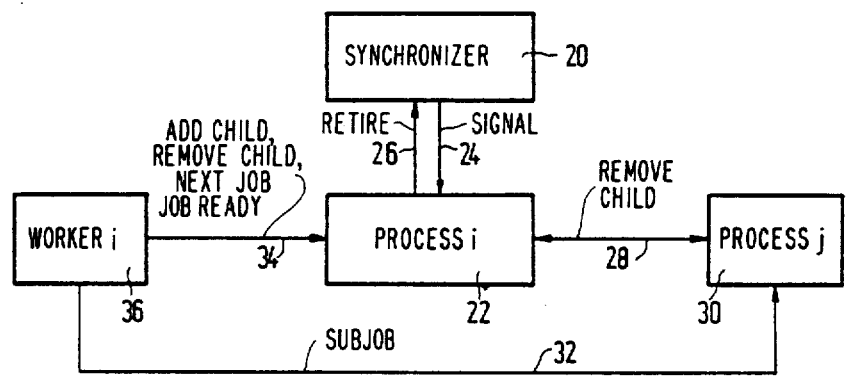
FIG. 2 is an interrelation diagram among standard processing and the synchronizer process.
Figure 3:
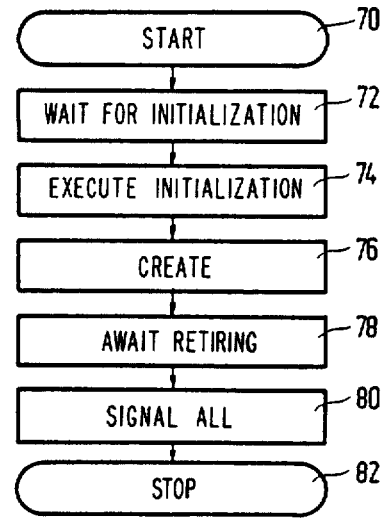
FIG. 3 is a flow chart of the synchronizer process.

In this respect, reference is had to FIG. 3, which is a flow chart of the synchronizer process. In block 70, the system is started. In block 72, the synchronizer process waits for the message "initialization". In this block, which effectively represents a waiting loop, the synchronizer process may be initialized by an external operation. Initialization (74) means that the synchronizer is told how many processes 22 are to be supervised. In a multiprocessor system processors may be divided into disjoint subsets. Each subset is then provided with its associated synchronizer process, whereas one global synchronizer process keeps track of the other synchronizer processes. In similar manner, still more synchronization levels may be used. FIG. 2 for simplicity, shows only a single level of synchronizer process.

Now block 76 signifies that the actual number of local processes is created, usually one for each processor. In this respect reference is had to FIG. 4, which is a flow chart of this creation. In block 90, the operation is started. In block 92 an array is generated; the number of elements of this array is equal to the number of processes, each element also containing the actual address, calling name, or the like. In block 94 the array's parameter i is reset to zero. In block 96 the parameter's value is tested. As long as the array has not been treated completely, in block 98 the synchronizer process 20 sends a first message to the local process 22 in question; this information also contains a calling name of process 22 and, if applicable, of its number of sub-processes; and also the "calling names" of the array and the identity of the synchronizer process, thus enabling process 22 to thereafter call for the synchronizer process. The array parameter is incremented as long as feasible (block 100). Next, blocks 102, 104, 106, 108 provide each local process with a second message. The content of this second message is a request for the local process to start execution (i.e. it becomes active). Note that the latter operation could have been made by a broadcast message. In block 110 the creation is finished.

Figure 4:
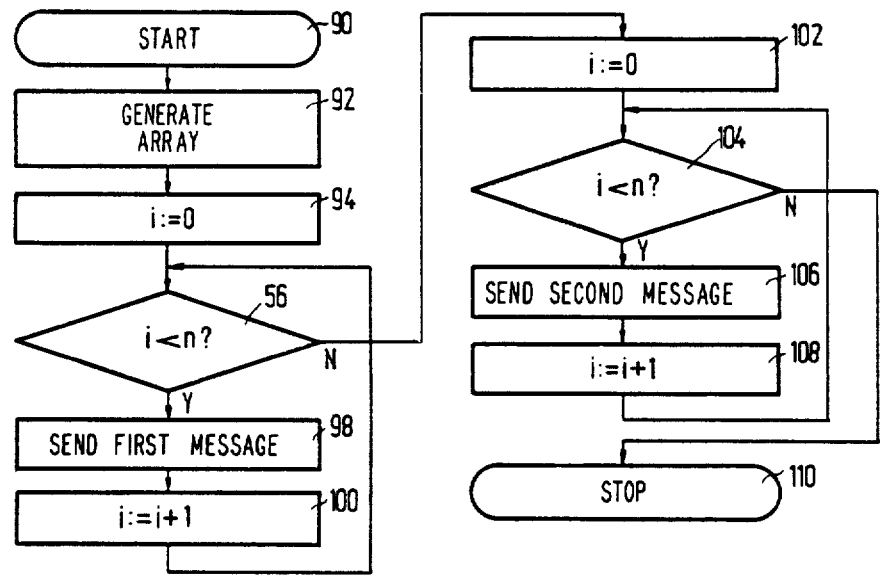
FIG. 4 is a flow chart of the creation of local processes for the synchronization.

In block 78 of FIG. 3 the synchronizer process now awaits the successive retiring of all other processes. If so, the successive "signalling" of all processes is executed (arrow 24 in FIG. 1). This signalling is executed in similar way as shown in FIG. 4 for the starting. Thereafter, in block 82 the situation is stable and appropriate measures can be taken. For example, if all processes of a complex task are now quiet, the result of such task is now available and/or a new task can be undertaken.

In FIG. 2 the interaction between blocks 20 and 22 has now been fully described. The description of the various blocks in the realization with the language POOL-T will be described later. Now, initially, all processes start working, to ultimately transform their state from the state -active- to the state -passive, quiet-. When so working, a process Pi may require another process Pj(i≠j) to do some work for it. This means that when Pj is quiet, it has to turn its state into -disquiet- before starting working again. When this is the case, we call Pj a child of Pi and Pi the father of Pj. Once Pj is quiet again, the father-child relation is terminated. We now introduce the following restrictions:

A process can be quiet only when it has no children, and when furthermore its work is finished.

A process can have at most one father.

The second restriction implies that Pj only becomes a child of Pi if it is quiet at the moment that it receives the message for doing work for Pi. Otherwise, its state is not changed, but it will perform the work for Pi. Hence, a child can preform sub-jobs for several processes, although only one of them is its father. This father-child relation terminates only when the child is quiet again, i.e. when all of its jobs have been performed. Note that a passive process is either quiet or a child of some other disquiet process. We capture these restrictions in the following invariants.

I1: if P is active, this implies that P is disquiet;
I2: if P is passive, this implies that P has retired;
I3: the father/child relation between two processes is bidirectional;
I4: a father/child relation between two processes implies that both are disquiet;
I5: if two processes P1, P2 both are father of a third process, processes P1, P2 are identical;
I6: if a process is quiet, it has no children;
I7: if a process P is passive, then either P is quiet, or there is a process Q that is the father of process P;
I8: if P is both passive and disquiet, this means there is a chain of processes Q0 ... Qm, each successive pair having a father/child relationship, with Q0 active, all others passive, disquiet, and m non-negative;
I9: (if for all i the associated process Pi is -passive-) implies that for all i the associated process Pi is -quiet-), which follows from {I1 ... I8}.

We now construct a program which maintains these invariants and which establishes the first part of invariant I9.

DESCRIPTION OF A PREFERRED EMBODIMENT

Hereinafter, a preferred embodiment of the inventive method is described. The description is formatted according to the so-called "object-oriented" language called POOL-T. This language has been amply described in the report ESPRIT PROJECT 415A, document 0091, F. America, Definition of the Programming Language POOl-T, Sept. 9, 1985, N. V. Nederlands Philips Bedrijven, Eindhoven, the Netherlands.

One problem that must be discussed beforehand is the necessary avoidance of deadlock. One of the particularities of the cited language POOL-T is that mutual signalling between any two disquiet processes could cause a deadlock situation. This could occur because a process cannot answer a message while sending one. To avoid this problem, to each local process P0 ... Pn-1 a respective sub-process called Worker (0 ... n-1) is added which does the work. This latter sub-process (block 36) is called when its process is in a disquiet state. The Worker does the real work, while the original process keeps tab of the progress of this work. If no work is left to be done by the Worker, this is signalled to the associated local process. Thereupon this process transforms its own state to -passive, quiet-. Up to then, it may have been either active or -passive, disquiet-. During execution of the work, the sub-process Worker may send messages to other local processes (i.e. Process j, block 30) to have sub-work (a sub-job) done. This yields the communication scheme of FIG. 2. Processes signal each other to remove a child, but this particular signalling can never cause a deadlock. A worker sub-process signals its own process that a child is being added, that a child is being removed, that a particular job is requested to be undertaken, or that a particular job is ready, as the case may be. Furthermore, the worker may signal to another process the commissioning of a subjob. In FIG. 2 the interaction between the various elements is shown. For simplicity, the communication between Process j (30) and the synchronizer has not been shown. Neither has the worker sub-process to process j been shown.

DESCRIPTION OF AN EMBODIMENT IN POOL-T

In this respect table Ia, b shows various elements of the synchronizer process 20 as worded in the high-level language POOL-T, referred to hereabove. This language is particularly suited for use in concurrent processing environment. Although the reference gives an extensive and elucidating treatise of POOL-T, for convenience hereinafter a brief expose of this language is given. It is an object-oriented language in that all elements therein are objects, with -object- and -processbeing identical. A program starts with a definition of an object and the behaviour of the category (=class) of the object(s) in question. An object, as a particular realization in a category, usually has available the following:
one or more local variables
one or more local subroutines
a body which describes the process' behavior.

The objects communicate by means of message. For example, if object A executes a statement that reads -B!m(p1 ... pk)- the realization is that A sends a message m to object B (the exclamation sign delimits the destination object) with parameters p1 ... pk. Thereafter object A must wait until an answer to this particular message is received. If object B executes the state -ANSWER(m)-, object B must wait until message m arrives (independent of the sending object's identity) and thereafter calls its own subroutine that is called m, with parameters as they are contained in the message m. After the subroutine m has produced the necessary result, which is again an object, this result is thereupon returned to object that had sent message m. In particular, a routine is a subroutine of a class (not of an object). A prime usage of such routines in POOL-T is to create a new object of that particular class. Note that any object can all any routine.

DESCRIPTION OF THE SYNCHRONIZER PROCESS

In table I, -CLASS Synchronizer- is the type definition of the process "Synchronizer": all following elements of table I together constitute such synchronizer. -VAR- is the declaration of the local variables, in this case an array of processes (each of class Process), and an integer n. -ROUTINE- indicates a routine that may be freely called by any other object. -ROUTINE new- is the definition of the routine that is called -new- and which returns an object of type Synchronizer. This routine -new- by definition has a single parameter p of type integer. The colon indicates the behaviour of the routine to follow thereafter. -RETURN- indicates that the next operation produces a particular result. This particular result is that a message is sent, as expressed by the exclamation sign. The destination is the object -NEW-, which is drawn in capitals to define it as a new object (not related to the name "new" of the routine itself). The message actually sent is the message -init- with parameter p. This message is defined later in table I. Note that the sequence of occurrence of the elements in table I is irrelevant. -END new- indicates that this is the end of the description of the routine -new-, started two lines earlier. The above corresponds to block 70 in FIG. 3.

The synchronizer class contains five subroutines. These subroutines may only be called by/from the synchronizer object to which they belong. -METHOD- indicates such subroutine. -METHOD init- is the subroutine -init- that upon being called is used to initialize an object of type -Synchronizer- as is described thereafter. The subroutine has available a parameter p with integer values only. The colon again indicates that the behaviour of the subroutine follows after this colon. The only operation of the subroutine is the assignment to n of the then actual value of p. -RETURN- again indicates that the next operation produces a particular result. -RETURN SELF- indicates that the result is the naming of the object to which this subroutine is local (i.e. the subroutine -init-), which result becomes available for the object that had sent the message -init-. This indicates (-END init-) the end of the subroutine init. The next subroutine is called -create- and is of type Synchronizer. The brackets indicate that no parameter is entailed. The colon indicates that the next-following actions are executed. First a local variable i is declared of category integer. -IN- functions as delimiter. Next, the private variable -processes- is filled by an array of the category of -Array (Process)-, which has been mentioned earlier. The dot, followed by -new- indicates the call of the routine -new- that is local to class (Array (Process)) that was mentioned earlier (under VAR). Moreover, this routine has two parameters 0, and (n-1) indicating the lower and upper bound, respectively, of the array that is returned by this creating subroutine. Next, the variable i is set to zero and a loop is executed as being delimited by the words D0 ... 0D. In the loop -(THEN)- the array of processes gets a message -put-. This message contains the actual value of i, indicating the index in the array at which the expression in parentheses is stored. This expression -Process.new(SELF, processes)- indicates a call of the routine -new- of class -Process- with parameters -SELF- (i.e. the synchronizer) and -processes-, i.e. the calling name of the array containing all processes. The result of this routine call is a new process.

This loop is circled once for each of the n values of i. Next all n processes just created successively in a second loop structure get the message -start- (with no parameter). At the end of the second loop the result of this subroutine is the synchronizer again.

The subroutine -await_retiring( )- waits as long as not all n -retire- messages have been received. The subroutine -retire( )- is used for a process to signal the (only) transition from active towards passive, quiet to the synchronizer. In the subroutine -signal_all ( )- all processes get the appropriate message -signal( )-. The expression -(process @i)- means that the processes are indexed according to i, to thereby obtain the i-th process as a message destination. Finally the -BODY- defines the sequence of execution of all subroutines. First, the process awaits initialization (by some higher level object). Next, successively the subroutines -create-, -await_retiring- and -signal_all- are executed. This ends the description of the Sycnhronizer.

Thus -BODY- shows the sequential structure of the subroutines and represents in a way the same characteristics as did FIG. 3. Thus, the diagram of FIG. 3 represents the establishing of a global binary assertion in a multiprocess, multiprocessor environment. The naming of the three states is of course arbitrary. Each state may be distributed into substates, which is irrelevant to the description hereabove. The eight invariants I1 ... I8 listed earlier have proved to be sufficient.

DESCRIPTION OF THE LOCAL PROCESSES

The Synchronizer process described supra thus creates an array of local processes, the latter having the specific task to signal the (only) local transition from -active- to -passive, quiet-, whereas the synchronizer process counts these signals as they arrive. Now, Table II gives the elements of the -Worker- subprocess (block 36 in FIG. 2).

First, the class -Worker- and the necessary variables are declared. The latter are an array of processes and a local process called -myprocess-. As before, next, the routine is specified, and called -new-. This routine contains as parameters the local process called -myp-, and a parameter p which is the array itself. The routine creates the subprocess -Worker- and next sends to it the message -init- with parameters -myp- and p. Three subroutines of the -Worker- subprocess are thereupon defined. In the initialization -init- subroutine, the local process and the array are initialized. In the delegation subroutine: -delegate—sub—job- (to a non-local process) a parameterless message -add—child- is sent to its own local process. The statement bracketed by IF . . . FI is the condition statement. Note that the-tilde- indicates a negation. If the result of the sub-job sent to the non-local process p happens to be -false- (the creating of a sub-job is described in Table III), then the parent/child relationship is terminated: the parameterless message -remove—child- is sent to the local process (the Worker's patent). Thereupon the result of this subroutine is returned to the object that had called it. The subroutine of the Worker subprocess itself: -do—the—job- (no parameter) is listed next, but not specified, as the content thereof is not essential to the invention. It may do a particular job, for example, execute the garbage collection as explained hereinafter, and it also may delegate sub-jobs to other processes. The latter is executed by means of the subroutine delegate—sub—job. The body of the routine itself is listed next. It first waits for initialization. The DO . . . OD brackets represent an infinite loop (TRUE). First a message -next—job- is sent to the local process indicating that the next job is requested to be executed. Next, the job proper is executed (by calling the subroutine). Finally the -job—ready- message is sent to the local process. This ends the description of the block worker (36).

Table III in similar way lists the elements of the local processes (block 22, 30 in FIG. 2) to which the respective -Worker- subprocesses are subaltern.

First, the variables -active-, -quiet-, -dead- are declared. The first indicates the active/passive state of a process, the second indicates the quiet/disquiet state of a process, the third indicates the attainment of global quiescense. Note that the combinations active/dead, active/quiet and disquiet/dead cannot occur, so that in fact, only four different states are reacheable. Next, there is a process -Synchronizer-, a further process -father-, and the numbers of children and jobs, respectively, which are integers. The specification of the routine follows, in similar way as described earlier. The initialization -init- of the process is the next subroutine. The Synchronizer process becomes -s- (i.e. the parameter of -init-). A new local worker subprocess is created by calling the routine -new- of class -Worker-. This routine has two parameters, the local process -SELF- and the array containing all processes -p-, which array has been defined in Table II. Finally, the five variables get appropriate values, and the result is returned to the calling object. The above implies that every process -Process- starts working after creation.

The next three subroutines are the starting of Process, and the upward and downward modifications respectively, of the number of children of a particular process. The next subroutine manages the Boolean value -quiet- associated to the sub-job (parameter is the name of the father process). First, upon reception of a request to perform a sub-job the number of jobs to be executed by this particular sub-process is incremented and the value of the Boolean -quiet- is returned to the calling process. If the value was true, the current process is to become the calling process child. The remembering in the current process of the calling process identity (number of calling name) is thereafter (POST) executed in the conditional statement. Obviously, if the numbers of both jobs and children were zero, the Boolean -quiet- is true and vice versa. Finally, the Boolean -quiet- is made (or kept) false.

The next subroutine -job—ready- represents the signalling by the -worker- subprocess that a job is finished: the number of jobs is decremented and the result is returned to the calling process.

The next subroutine -next—job- represents the request by a -Worker- subprocess to be allowed to start execution of a next job. This message will only be answered when the number of jobs waiting for execution is greater than zero.

The next subroutine -work- represents the signalling by a subprocess of its actual state. In particular, this subroutine is used to go from the -disquiet- state to the -quiet- state. First the Boolean-quiet- is made true, if there are neither jobs to be done, nor unfinished subjobs farmed out (i.e. no children exist) (in accordance with earlier invariances I4, I6). Next, a loop is executed (DO . . . OD bracketing). As long as the process is disquiet, one of the actions bracketed by SEL . . . LES is executed. Note that for each execution only a single message is receivable, namely the first one that becomes active. If the number of jobs is non-zero, the process awaits the -next—job-message. The process also waits for one of the messages -job—ready- (leading to a decrementation of the job number), -add—child-, -remove—child-, or -sub—job- (leading to an incrementation of the job number). The number of jobs and/or children may be changed and therefore, the value of quiet is recalculated. Thereafter the result is returned to the process that had called the subroutine. Note that this subroutine only terminates when the process has become quiet.

The next subroutine -retire- represents the retiring of a process, i.e. the first and only transition from active to passive, quiet. To the -synchronizer- process is sent the -retire- message and thereupon the Boolean -active- is made false. Thereupon the result is returned to the calling process.

The next subroutine -wait—for—signal- represents the waiting for a -signal- of a process. As long as the variable -dead- is false, one of the next following answers is expected. If the message -sub—job- is received, the sub—job is executed (as job) by calling the subroutine -work-. Thereafter, the job is ready and the process is quiet again and a message to remove a child is sent to the -father- process. Alternatively, the message -signal- may arrive indicating that global quiescense has been established. In the end, the result is returned to the calling process.

The next subroutine -signal- represents the counterpart thereof, i.e. the signalling itself. First the Boolean -dead- is made true. Next the result is returned to the calling process.

Finally the body of the process contains the following subroutines. First, the initialization is awaited. Next, the starting is awaited. Thereafter, three subroutines are executed. First is the subroutine -work-, which terminates in a -quiet- state. Next is the subroutine -retire- that signals to the Synchronizer the transition from active to passive, quiet. Last is the subroutine -wait—for—signal- which terminates in a global -quiet- state. Therewith, the description of Table III and of blocks 22, 30 in FIG. 2 terminates.

The worker process executes work. It could perform the garbage collection as explained hereinafter.

GARBAGE COLLECTION IN AN ELEMENTARY SYSTEM

As an application and extension of the invention, hereinafter a distributed and so-called on-the-fly garbage collection system will be described. On-the-fly means that it is not necessary to wait for the processing to reach a certain point before the garbage collection operation could be started. Of course, a particular processor having only capability for executing a single process at a particular instant must therefore switch to the process necessary for the garbage collection. Hereinafter, first for reasons of clarity, the garbage collection on simpler systems is explained.

Garbage collection, and the ensuing removal of garbage from a memory is necessary in situations where a continual production of stored objects is effected, while memory capacity is limited. Objects may be various kinds of data, data structures, programs, etcetera. Such objects may be isolated or linked, in that another object contains a reference thereto. The nature of the reference may be a subroutine call, a name of a data structure, or other. Certain objects are active or have other properties that make them necessary to be retained in memory. Such object is conventionally termed a "root" or "root object". The status of the root indicates that it presently is not garbage. If an object is no longer referred to directly or indirectly by a "root" it is called "garbage". If the system knows all garbage objects as distinct from non-garbage objects and such knowledge is stable, the removal of the garbage from memory may be effected simply by setting an indicator relating to the associated memory space to the state "empty". The memory space would then be available for another usage. Hereinafter, first, a realization of the garbage collection on a single-process, single processor system is described. Herein, the existence of garbage is detected by means of assigning to each particular object a three-valued variable, which for convenience is called color. The three values or colors are called black, grey and white. Proven non-garbage objects are colored black or grey. Initially white is the color of potential garbage objects, Now, roots are initially colored grey, all other objects are initially colored white. This coloring of root and non-root objects may be effected without external referencing, i.e. without consideration of any operation or state in another processor. Note that an object may be a root for various reasons, and thus, the color may itself be an aggregate value based on a variety of underlying values. The coloring information may be stored in a predetermined location within the object in question, e.g. in an associated segment descriptor. Note that the three-valued color variable is unrelated to the three-valued variable indicating the active/passive state: color transitions can only go from white to grey and from grey to black, after some initial coloring.

The following invariants or prescriptions are considered that must be adhered to by the process with respect to the now defined color variables:
P0: a reference from a black object to a white object cannot exist;
P1: every object which initially would be garbage will remain white;
P2: root objects are never white.

The following operations are now effected: access any grey object; if this grey object contains a reference to another, white object, color first any white object so referred to grey and thereafter color the originally grey object black; irrespective of whether any reference to another object exists, or not. This marking process terminates when all grey objects have been discolored to black and all objects are thus either black or white. The process leaves the above prescriptions unaffected. Moreover, it may be proved that the above operation takes only a finite time. Then, all white objects remaining now are garbage. The number of white objects may only have decreased; in fact, it may even have become zero. Thus, white objects are at least conditionally garbage. Grey objects are condition generative, with respect to white objects. Black objects are condition unrelated, in that they do no more determine the condition of any white object. After removal of the garbage a new garbage collection may be effected when necessary. This method has been described in E. W. Dijkstra et al., On-the-fly Garbage Collection: An exercise in Cooperation, Comm. ACM 21, 11 (November 1978) p. 966-975, which describes garbage collection for the case of two processors and a shared memory. After giving a certain extension of this prior art system, the present invention uses this method for a true distributed system, according to the synchronization described hereabove.

EXTENSION TO A SINGLE PROCESSOR, MULTIPROCESSOR SYSTEM

In a single process system the status variables of all objects are invariant if the single process is stopped. In a multiprocess system this is no longer valid, and moreover, no track is being kept on whether the respective processes are stopped or not. If the garbage collection operation is effected in a running machine, e.g. with time division multiplex among the garbage collection process and other processes, the latter processes must obey certain preconditions. A white object that becomes a root must therefore be colored grey at such becoming to adhere to maintaining the above three prescriptions. If a black object would acquire a reference to a white object, the white object must be colored grey. In the particular embodiment, the realization of the interrelationship between the various processes is again realized in the language POOL-T, whereas the coloring operations are executed according to the cited reference. Now, an object labelled black may not receive a message that would refer to a white object. To obey this prescription the originator of the latter message must see that all white objects referred to in the message be colored grey first. The solution is attained in that for the sending of the message, the sending process temporarily takes over the garbage collection and effects the necessary color changing. Later, the original garbage collection process may be reactivated. If a new object is created it should be colored black, because at creation it cannot refer to another object, and hence its coloring will not violate P0.

EXTENSION FOR A DISTRIBUTED GARBAGE COLLECTOR SYSTEM

Next, an extension of the above for a distributed garbage collector system is described. Herein, each processor (having single or multiple user processes) has its own garbage collection process because no processor is allowed to directly access a non-local memory assigned to a different processor. The various processes again communicate via messages, and each processor must construct the notion "garbage/not garbage" for its own memory. Now, each processor executes the operations described supra for a single-processor system. As long as no object contains a reference to another object present at another processor, the operation will attain a final position that is justified. However, in case of cross-processor referencing it may occur that the seemingly final state of "no grey-colored objects left" may be disturbed by later cross-processor references from another processor, so that a further recoloring from white to grey may ensue.

Figure 5:
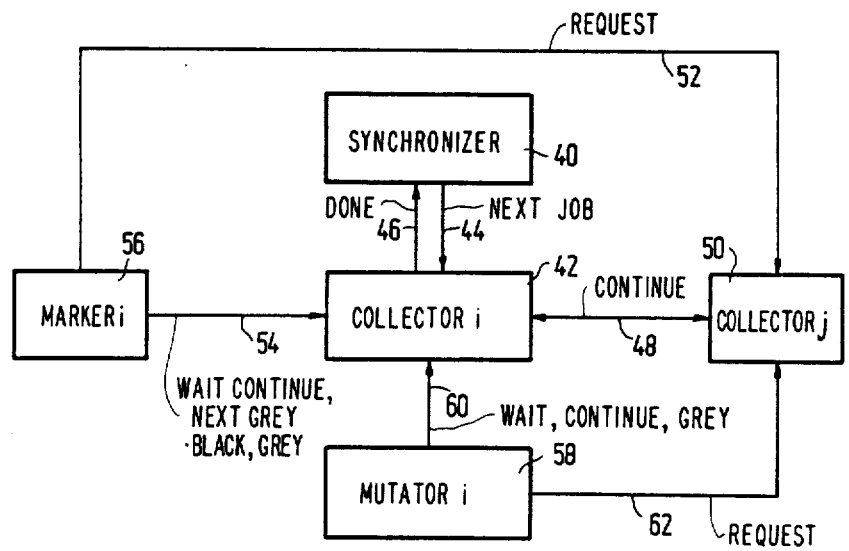
FIG. 5 is an extended and generalized version of FIG. 2 for the garbage collection.

In correspondence to FIG. 2, the organization of FIG. 5 shows a set-up with a global synchronizer process 40. For each separate processor furthermore there is assigned a local "collector" process 42 which for its "own" objects initially assigns the color grey to "root" objects and the color white to non-root objects. The first synchronization operation is the assessment that all collector processes have executed this initial coloring. According to the POOL-T language precept, an object is non-garbage if it is either (1) Active, i.e. executable,
(2) Sending, i.e. it has sent a message and is waiting for the result.
(3) Accessible from a non-garbage object, i.e. some other non-garbage object holds a reference to it.

An object is garbage if it is not non-garbage. Note that as a result of 2 and 3, also objects with a non-empty message queue are non-garbage, since they are reachable from a sending object. It turns out that the garbage collection process will be more efficient when we add this latter category to the definition of non-garbage objects as well:

(4) Objects with a non-empty message queue.

Non-garbage objects of type 1, 2 and 4 are root objects since the fact that they are non-garbage follows immediately from their state. Note that each non-garbage object is either a root object or accessible, directly or indirectly, from a root object.

Garbage collection is done in two phases. The first one is called the marking phase, the second one the collection phase. At the end of the marking phase there are no grey objects left and therefore white objects must be garbage. In the following collection phase they are invalidated. In correspondence with FIG. 2, FIG. 5 has synchronizer 40 only communicating with the local collector processes 42. Arrows 44, 46 correspond with arrows 24, 26 respectively in FIG. 2. A -done- message on arrow 46 indicates that the local processor retires, and thus allows the next job to be requested. A -next job-message on arrow 44 indicates that all collector processes have retired and that the collection proper may be effected. As in FIG. 2, the marking of the various objects (the work in FIG. 2) is done by a subaltern process Marker 56, adjoint to block 42. Arrow 54 has messages indicating a -wait situation- (this is addition of a child), a -continue-situation (this is a removal of a child), a request for accessing the next grey object, a coloring message -grey- to color any local descendant (referred to by another memory item), and a discoloring message to black of an object, of which all descendants had been colored grey, or had been black already. Also, a non-local descendent process may be requested to execute a discoloring from white to grey (arrow 52).

The garbage collection is a concurrent process. Furthermore, the data processing proper (outside of the garbage collection operation) may continue. This means that such data processing proper may not violate the invariants of the garbage collection operation. The data processing proper in FIG. 5 is symbolized by the local mutator block 58, which in principle may modify the reference structure between objects. However, such modifying always must retain the above invariants P0, P1, P2. If such modification is to occur, mutator process 58 takes over temporarily the garbage collection process from the marker process 56 and it communicates in a corresponding way with the collector process 42. Along arrow 62 a request to another collector process 50 may be sent. Along arrow 60 the mutator process 58 may send the following messages to collector process 42: wait, continue (as marker process 56), -grey-, indicating that a white object is being referred to, or is becoming a root, so that it must be colored grey. Also, a new object is colored black, but this does not influence the garbage collection. Thus, the -Worker- process of FIG. 2 has been split into the marker process, which executes the "normal" coloring as if no further changes therein would occur, while the mutator process 58 may amend the underlying relationships. The nature of the mutator process has not been specified further, because it is not related to the present invention except it having to maintain invariants P0 . . . P2. Also in the multiprocessor case the garbage collection can take only a finite time, because any new object is always colored black upon creating. Other objects can only have a unidirectional discoloring: from white to grey and from grey to black. Due to the finiteness of the numbers of grey and white object this discoloring can take only a finite time.

LIST OF FIGURE CAPTIONS

FIG. 2: 20 Synchronizer; 22 Process i; 24 -signal-; 26 -retire-; 28 -remove child-; 30 Process j; 32 -subjob-; 34 -add child-, -remove child-, -next job-, -job ready-; 36 Worker i.

FIG. 3: 70 START; 72 WAIT FOR -INIT-; 74 EXECUTE -INIT-; 76 CREATE; 78 AWAIT RETIRING; 80 SIGNAL ALL; 82 STOP.

FIG. 4: 90 START; 92 GENERATE ARRAY; 98 SEND FIRST MESSAGE; 106 SEND SECOND MESSAGE; 110 STOP.

FIG. 5: 40 Synchronizer; 42 Collector i; 44 -next job-; 46 -done-; 48 -continue-; 50 Collector j; 52 -request-; 54 -wait-, -continue-, -next grey-, -black-, -grey-; 56 Marker i; 58 Mutator i; 60 -wait-, -continue-, -grey-; 62 -request-.

What is claimed is:

1. A method for operating a multiprocessor data processing system, which system includes synchronization means for executing a process comprising the following steps:

a. assigning to each processor at least one object, each object having a respective state variable which has three possible values:
  active, disquiet
  passive, quiet
  passive, disquiet, and active, disquiet being an initial state, b. governing all objects in the system according to the following rules:
   i. any object, the value of whose respective state variable includes disquiet, is allowed to cause any other object to cause the value of the respective state variable of that other object to include disquiet;
   ii. any object, the value of whose respective state variable includes quiet, is not allowed to cause any other object to cause the value of the respective state variable of that other object to include disquiet;

iii. in any object (referred to hereinafter as a "father object"), that has caused another object to cause the value of the state variable of that other object (referred to hereinafter as a "child object") to include disquiet, the respective state variable retains its current value at least as long as the value of the respective state variable of the child object includes disquiet; and iv. any object, which is not a father object, is allowed to cause its own respective state variable to assume said passive, quiet value while signalling same to another object that is a father object, whereby a rigid hierarchy between all objects is not needed;

c. assigning to each object (22) a respective local process (36) that handles all interactions with other such objects (30);

d. assigning a global synchronizer process (20) for determining when all objects (22, 30) have respective state variables which have at least once had the passive, quiet value;

e. causing all state variables to have the value active, disquiet;

f. executing said objects;

g. sending to said global synchronizer process a retirement signal from each respective object when the respective state variables assume the values passive, quiet for the first time; and h. in said global synchronizer process, determining when the number of said retirement signals becomes equal to the number of said objects, the respective state variables of all objects then having the value passive, quiet, thereby creating a global assertion.

2. The method of claim 1 comprising, during at least one of said executing, sending and determining steps, the further step of keeping any child object privy to a first father object, which keeping step occurs within such child object, so that such child object changes the value of the respective state variable of such child object from including disquiet to including quiet, independently of any messages from any potential second father object of such child object.

3. The method of claim 1 comprising the further steps of a. pairing a respective worker process (36) with each respective local process, each respective local process being a respective communicator process (22), to form a plurality of communicator/worker pairs;

b. executing any work to be done by any communicator/worker pair by the respective worker process; and c. changing the value of the respective state variable and signalling any change in value of the respective state variable by the respective communictor process.

(d) during such modifying and signalling, temporarily halting a mutator process (58) in the memory item thus referred to; and III. the global synchronizer process:

(a) receives transition signals from the local collector processes signalling a change in the value of the respective state variable from active, disquiet to passive quiet; and (b) upon receiving such transition signals from all local collector processes, signals all local collector processes to treat any white local memory item as garbage.

4. The method of claim 3 comprising the further steps of a. signalling by any respective communicator process to the respective worker process when a job is to be undertaken; and b. signalling by any respective communicator process to the respective worker process when a job is ready.

5. The method of claim 3 comprising the further step of:

a. accessing a further communicator process by any respective worker process in order to assign subwork to the further communicator process.

6. The method of claim 5 comprising the further step of:

a. signalling by said global synchronizer process any positive result of said determining step to all local processes.

7. The method of claim 1, 2, 3, 4, 5, or 6 for garbage collection, wherein each object is a local collector process which is local to a respective one of the processors, each local collector process being (42) privileged for accessing a respective predetermined number of further local objects (referred to herein as "local memory items") associated to the respective processor while forbidding such accessing to any local collector process which is local to a different respective processor (50), the method comprising:

(I) each local collector process performing the following steps:

(a) assigning to any local memory item that is a root item a condition generative indication (referred to herein as "grey") and to any other local memory item a conditional indication (referred to herein as "white", any such or similar assigning of indications being referred to herein as "coloring");

(b) successively accessing any grey local memory items to determine whether such grey local memory items refer to any other referenced local memory items or referenced non-local objects (referred to herein as "memory items");

(c) assigning an unconditional indication (referred to herein as "black") to the grey local memory items accessed;

(d) upon such positive determination in step 16 I(b), coloring such referenced local memory items grey, if such referenced local memory items are white;

(e) upon such positive determination in step 16 I(b), signalling an appropriate associated collector process to color such referenced memory items grey;

(f) repeating steps 16 I(b)-(e) until there are no grey local memory items left;

(g) changing the value of the respective state variable of the local processor to passive, quiet when there are no grey local memory items left; and (h) upon reception of any request, from any other collector process, for changing any local memory item from white to grey, (A) changing the value of the respective state variable of the local collector process from passive, quiet to passive, disquiet; and (B) returning to step 16 I(b); and II. in the global synchronizer process:

(a) receiving transition signals from the local collector processes signalling a change in the value of the respective state variable from active, disquiet to passive, quiet; and
(b) upon receiving such transition signals from all local collector processes, signalling all local collector processes to treat any white local memory item as garbage.

8. A multiprocessor data processing apparatus comprising
   a. a plurality of processors, each processor comprising local storage means storing at least one object, said at least one object comprising
      i. a respective state variable which has three possible values:
         active, disquiet
         passive, quiet
         passive, disquiet,
         but which assumes said active, disquiet value in an initial phase, and;
      ii. means for detecting a first transition from an active state to a passive state, said active state occurring when the respective state variable includes an active value and said passive state variable includes a passive value, upon execution of the object; and
      iii. a local process for handling all interactions with other objects, so that the following rules are followed by all objects:
         (A) any object, the value of whose respective state variable includes disquiet, is allowed to cause any other object to cause the value of the respective state variable of that other object to include disquiet;
         (B) any object, the value of whose respective state variable includes quiet, is not allowed to cause any other object to cause the value of the respective state variable of that other object to include disquiet;
         (C) in any object (referred to hereinafter as a "father object"), that has caused another object to cause the value of the state variable of that other object (referred to hereinafter as a "child object") to include disquiet, the respective state variable retains its current value at least as long as the value of the respective state variable of the child object includes disquiet; and
         (D) any object, which is not a father object, is allowed to cause its own respective state variable to assume said passive, quiet value while signalling same to another object that is a father object,
         whereby a rigid hierarchy between all objects is not needed;
   b. a communication network interconnecting the processors; and
   c. synchronizer process storage means including:
      i. counting means fed by said detecting means for counting the first transitions up to a maximum value associated with a number of objects; and
      ii. broadcasting means fed by said counting means for, upon attainment of said maximum value, signalling a -ready- synchronization signal to said processors, thereby establishing a global assertion.

9. The apparatus of claim 8 wherein said local process keeps any object that is a child object privy to a first father object, in that such child object causes the respective state variable of such child object to change from including a disquiet value to including a quiet value, independently of any messages from any potential second father object of such child object.

10. The apparatus of claim 8 wherein each local process comprises a respective worker process paired with a respective communicator process to form a respective worker/communicator pair, so that the respective worker process executes any work requested to be done by the respective worker/communicator pair and so that any change in the value of the respective state variable is signalled by the respective communicator process.

11. The apparatus of claim 10 wherein, within each worker/communicator pair the respective worker process signals to the respective communicator process when a job is requested to be undertaken and when a job is ready.

12. The apparatus of claim 8 wherein one of the respective worker processes signals a respective communicator process of another worker communicator pair to assign subwork thereto.

13. The apparatus of claim 12 wherein said broadcast means signals to all the local processes upon determining that the respective state variables of all local processes have assumed the value passive, quiet.

14. The apparatus of claim 8, 9, 10, 11, 12, or 13 wherein:
I. said means for detecting detects a transition in value of the respective state variable from active, disquiet to passive, quiet; and
II. said processors include respective storage means for:
   a. storing each object as a local collector process, local to a respective one of the processors, for:
      (i) assigning to any other local object (any other local object being referred to herein as a "local memory item" any other object which is not local being referred to herein as a "memory item"), that is a root item, a condition generative indication (referred to herein as being "grey") and to any other local memory item, that is not a root item, a conditional indication (referred to herein as being "white", any such or similar assigning of indications being referred to herein as "coloring");
      (ii) successively accessing any grey local memory items to determine whether such grey local memory items refer to any other referenced local memory items or referenced memory items;
      (iii) assigning an unconditional indication (referred to herein as "black") to such grey local memory items accessed;
      (iv) upon such positive determination in step 23 IIa (ii), coloring such referenced local memory items grey if such other local memory items are white;
      (v) upon such positive determination in step 23 II a (ii), signalling an appropriate associated collector process to color such referenced memory items grey;
      (vi) repeating steps 23 IIa (ii)-(v) until there are no grey local memory items left;
      (vii) changing the value of the respective state variable of the local processor to passive, quiet when there are no grey local memory items left;
      (viii) upon reception of any request, from another collector process, for changing any local memory item from white to grey:

(A) changing the value of the respective state variable of the local collector process from passive, quiet to passive, disquiet; and (B) returning to step 23 IIa (ii);

(b) accommodating storage of the local memory items and the memory items;

(c) dynamically modifying a reference from a local memory item to any other memory item while thereupon signalling such modifying to the collector process (52, 50) associated with the memory item thus referred to;

(d) during such modifying and signalling, temporarily halting a mutator process (58) in the memory item thus referred to; and III. the global synchronizer process:

(a) receives transition signals from the local collector processes signalling a change in the value of the respective state variable from active, disquiet to passive quiet; and (b) upon receiving such transition signals from all local collector processes, signals all local collector processes to treat any white local memory item as garbage.

* * * * *